(12) United States Patent
Qian et al.

(10) Patent No.: US 11,935,297 B2
(45) Date of Patent: Mar. 19, 2024

(54) ITEM MONITORING FOR DOORBELL CAMERAS

(71) Applicant: ObjectVideo Labs, LLC, Tysons, VA (US)

(72) Inventors: Gang Qian, McLean, VA (US); Allison Beach, Leesburg, VA (US); Sima Taheri, McLean, VA (US); Sravanthi Bondugula, Vienna, VA (US); Sung Chun Lee, Tysons, VA (US); Narayanan Ramanathan, Chantilly, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 17/476,605

(22) Filed: Sep. 16, 2021

(65) Prior Publication Data
US 2022/0083782 A1 Mar. 17, 2022

Related U.S. Application Data

(60) Provisional application No. 63/079,300, filed on Sep. 16, 2020.

(51) Int. Cl.
*G06V 20/40* (2022.01)
*G06F 18/214* (2023.01)
(Continued)

(52) U.S. Cl.
CPC ............ *G06V 20/41* (2022.01); *G06F 18/214* (2023.01); *G06F 18/22* (2023.01); *G06V 10/225* (2022.01);
(Continued)

(58) Field of Classification Search
None
See application file for complete search history.

(56) References Cited

U.S. PATENT DOCUMENTS 9,892,379 B1 * 2/2018 Danyluk .............. G08B 29/188
11,599,392 B1 * 3/2023 Huang ................... H04L 67/10
(Continued)

OTHER PUBLICATIONS

Amazon, "Amazon Rekognition FAQs" pp. 1-20, aws.amazon.com. Online. Sep. 9, 2020; retrieved from the internet: <URL: https://web.archive.org/web/20200909060302/https://aws.amazon.com/rekognition/faqs/>. (Year: 2020).*
(Continued)

*Primary Examiner* — James M Anderson, II
(74) *Attorney, Agent, or Firm* — Fish & Richardson P.C.

(57) ABSTRACT

Methods and systems, including computer programs encoded on a storage medium, are described for implementing item monitoring using a doorbell camera. A system generates an input video stream that has image frames corresponding to detection of activity at a property. Timing information is generated for the video stream and includes a timestamp for each image frame of the stream. Using the timing information, the system processes a pre-event image frame that precedes detection of the activity and a post-event image frame that coincides with detection of the activity. An image score is computed with respect to placement of a candidate item at the property in response to processing the pre-event and post-event image frames. The image score is used to determine that a first item was delivered to the property or that a second item was removed after being delivered to the property.

18 Claims, 6 Drawing Sheets

(51) Int. Cl.
   *G06F 18/22*    (2023.01)
   *G06V 10/22*    (2022.01)
   *G06V 10/25*    (2022.01)
   *G06V 20/52*    (2022.01)
   *H04N 7/18*     (2006.01)

(52) U.S. Cl.
   CPC .............. *G06V 10/25* (2022.01); *G06V 20/46* (2022.01); *G06V 20/48* (2022.01); *G06V 20/52* (2022.01); *H04N 7/18* (2013.01); *G06V 20/44* (2022.01)

(56) References Cited

U.S. PATENT DOCUMENTS

| | | | |
|---|---|---|---|
| 2019/0130580 A1* | 5/2019 | Chen | G06V 10/82 |
| 2020/0196788 A1* | 6/2020 | Juhasz | G08B 13/06 |
| 2020/0267354 A1* | 8/2020 | Siminoff | G06V 40/16 |
| 2022/0083964 A1* | 3/2022 | Silverstein | G06Q 30/0282 |

OTHER PUBLICATIONS

Amazon, "Amazon Rekognition FAQs," aws.amazon.com. Online. Sep. 9, 2020; [retrieved Nov. 15, 2021]. Retrieved from the Internet: <URL: https://web.archive.org/web/20200909060302/https://aws.amazon.com/rekognition/faqs/>; pp. 1-27.

PCT International Search Report and Written Opinion in International Appln. No. PCT/US2021/071481, dated Dec. 13, 2021, 8 pages.

\* cited by examiner

ITEM MONITORING FOR DOORBELL CAMERAS

CROSS REFERENCE TO RELATED APPLICATION

This application claims the benefit of U.S. Provisional Application No. 63/079,300, filed on Sep. 16, 2020, which is incorporated herein by reference in its entirety.

FIELD

This specification relates to monitoring items using an imaging device.

BACKGROUND

Monitoring devices and sensors are often dispersed at various locations at a property, such as a home or commercial business. These devices and sensors can have distinct functions at different locations of the property. Some sensors at a property offer different types of monitoring and control functionality. The functionality afforded by these sensors and devices can be leveraged to secure items at a property, to obtain information about respective items at multiple different properties, and to control certain safety devices that may be located at the properties. Sensors and devices at a property may include one or more cameras, such as an example doorbell camera. These doorbell cameras capture images and video in response to detecting motion at property. For example, the doorbell camera can capture images and video of a visitor or owner of the property when the individual is detected at an entrance of the property.

SUMMARY

This document describes techniques for implementing a package monitoring system for doorbell cameras. The system detects for human motion or motion of a robotic delivery vehicle in an area of interest associated with a field of view of a doorbell camera. The system is configured to detect that a package is present within the area of interest in combination with the detected human motion or robotic delivery vehicle in the area.

Some implementations of the system detect packages using a frame differencing technique, whereas some other implementations of the system detect packages using a background modeling and background subtraction technique.

Regarding the background modeling and subtraction technique, the system implements background modeling using image frames obtained before activity or motion is detected (e.g., pre-event) at the property and then implements background subtraction to determine or compute foreground regions in the both the pre-event image frames and image frames obtained after detection of the activity (e.g., post-event) at the property. The foreground regions are computed based on foreground image masks generated using the background modeling. The determined foreground regions for the pre-event and post-event image frames are characterized using a region-based similarity score that is computed based on local feature extraction and matching. The system compares the similarity score to a threshold and detects whether a package has been delivered or removed based on the comparison.

Regarding the frame differencing technique, the system implements frame differencing to determine or compute differences between image frames obtained when (e.g., before) activity or motion is detected and image frames obtained after detection of the activity, such as human motion or motion of a robotic delivery vehicle. The determined differences between the image frames are characterized using a change score. The system compares the change score or values associated with change score to a threshold and detects whether a package has been delivered or removed based on the comparison.

One aspect of the subject matter described in this specification can be embodied in a computer-implemented method. The method includes: generating an input video stream including at least one image frame that coincides with detection of activity within a threshold distance of a property; generating timing information for the input video stream, the timing information including a respective time stamp for each image frame of the input video stream; and based on the input video stream and the timing information, obtaining image frames including a pre-event image frame that precedes detection of the activity and a post-event image frame that coincides with detection of the activity. The method further includes computing an image score with respect to placement of a candidate item at the property in response to processing the pre-event image frame and the post-event image frame; and based on the image score, determining that a first item was delivered to the property or that a second item was removed after being delivered to the property.

These and other implementations can each optionally include one or more of the following features. For example, in some implementations, obtaining image frames includes: for a first time stamp, obtaining a pre-event image frame of an area of interest (AOI) having a boundary that overlaps with the property within a distance threshold from the camera; and for a second time stamp, obtaining a post-event image frame of the same AOI.

Obtaining image frames can include: obtaining a post-event image frame that includes an image bounding box, wherein the image bounding box: is configured as an overlay in the post-event image frame; and outlines the first item, the second item, or both the first item and the second item. In some implementations, the AOI includes a pre-event AOI that overlaps a portion of an area depicted in the pre-event image; and the AOI coincides with a field of view of the imaging device. The first item and the second item can be the same item.

Processing each of the pre-event image frame and the post-event image frame can include: processing each of the pre-event and post-event image frames using a machine-learning (ML) model that implements a deep-learning algorithm used to train the ML model for package detection based on multiple color images. The method can include: in response to processing the post-event image frame using the ML model, detecting, from the post-event image frame, that the candidate item was placed at the property; and in response to detecting that the candidate item was placed at the property, generating, using the ML model, the image bounding box as an overlay in the post-event image frame to outline the candidate item.

In some implementations, processing the pre-event image frame and the post-event image frame includes: computing a foreground region of the post-event image based on background modeling applied to the pre-event image; and extracting, using local feature extraction, a set of features from the foreground region. Computing the image score can include: computing the image score based on the set of features extracted from the foreground region. Computing the image score can also include: computing a region-based similarity score that characterizes similarity between respective regions of the pre-event image frame and the post-event image frame. The input video stream is obtained using a doorbell camera and a local frame buffer that is local to the doorbell camera.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

BRIEF DESCRIPTION OF THE DRAWINGS

Like reference numbers and designations in the various drawings indicate like elements.

DETAILED DESCRIPTION

A property, such as a house or a place of business, can be equipped with a property monitoring system to enhance the security of the property. The property monitoring system may include one or more sensors, such as motion sensors, camera/digital image sensors, temperature sensors, distributed about the property to monitor conditions at the property. In many cases, the monitoring system also includes a control unit and one or more controls which enable automation of various actions at the property. The actions can include receiving status signals from devices or components of the property are used to restrict access to certain areas at the property. The actions can also include triggering commands to arm or disarm a security system at the property based on the status signals.

In this context, techniques are described for implementing an advanced video analytics pipeline. The video analytics pipeline can be included in the property monitoring system, for example, as a sub-system of the property monitoring system. The video analytics pipeline is implemented using an imaging device that is located at an area of the property that serves as a location for receiving packages and other items. For example, the imaging device may be located at an entrance of a property. The video analytics pipeline is represented by sets of modules that cooperate to process image frames of an input video stream generated using the imaging device.

Using these modules, the video analytics pipeline can detect motion or activity corresponding to a human motion of a person or motion of a robotic delivery vehicle/apparatus approaching or leaving the entrance and detect delivery or removal of a package with respect to the detected human or robotic delivery motion. The property monitoring system uses the video analytics pipeline to generate pre-event and post-event image frames for an area of interest such as the entrance area of the property. In general, a pre-event image frame precedes detection of activity at a property, whereas a post-event image frame succeeds detection of the activity. A frame differencing or background subtraction technique is implemented at the video analytics pipeline to compute differences in image pixels values for packages, or candidate packages, which may or may not be present in the pre-event and post-event image frames.

An image change score is computed from at least the image pixel values for the packages and with respect to the detected motion or activity at the entrance. The image change score is compared to a threshold score. The system is configured to trigger an alert or notification that indicates detection, or removal, of a package in response to a comparison that reveals a particular change score exceeds a give threshold score.

Figure 1:
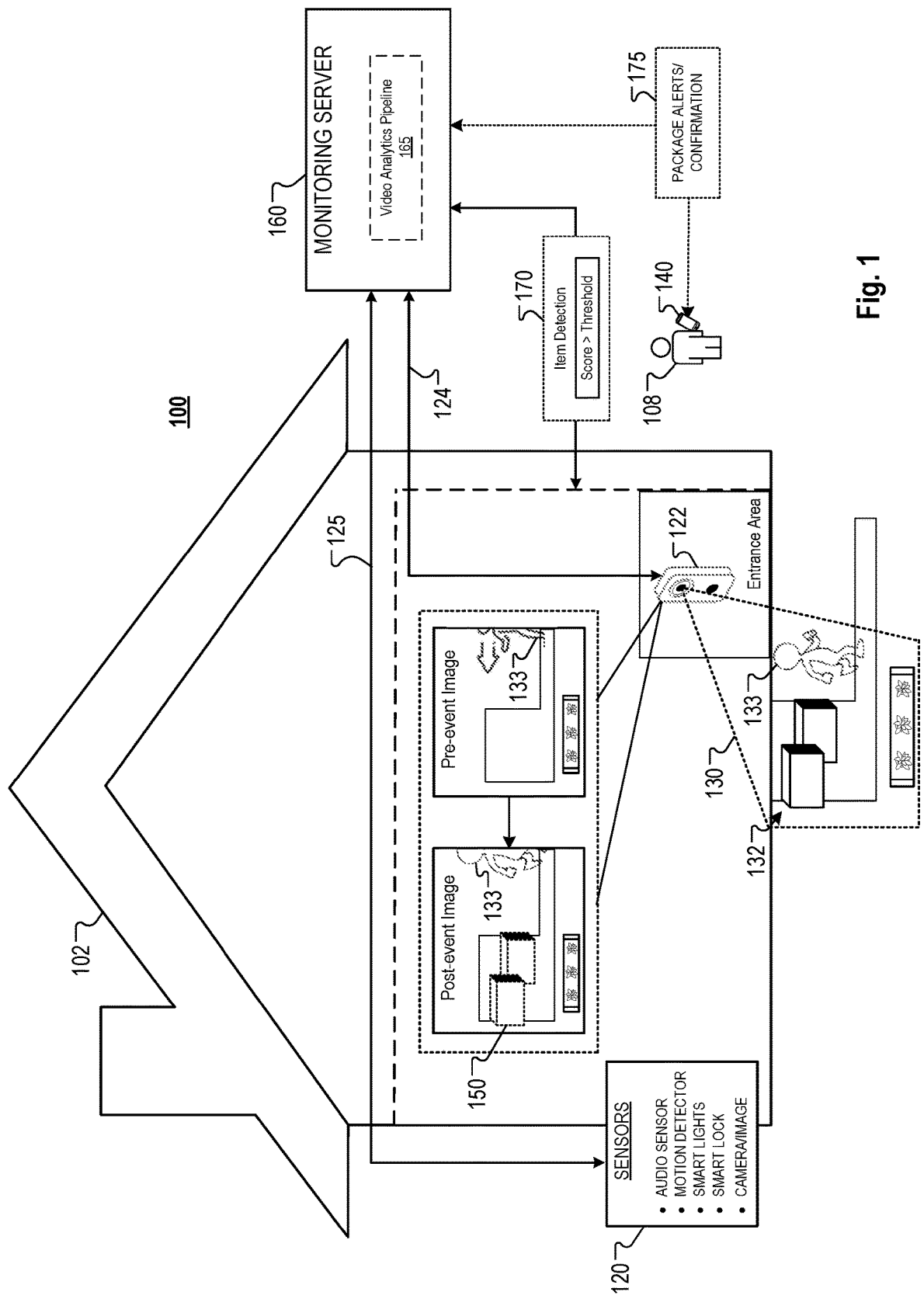
FIG. 1 is a block diagram of an example property monitoring system.

FIG. 1 shows a block diagram of an example property monitoring system 100 ("system 100") that can be used to perform one or more actions for securing a property 102 and for improving the safety of one or more occupants at the property 102. The property 102 may be, for example, a residence, such as a single family home, a townhouse, a condominium, or an apartment. In some examples, the property 102 may be a commercial property, a place of business, or a public property, such as a police station, fire department, or military installation.

The system 100 can include multiple sensors 120. Each sensor 120 can be associated with various types of devices that are located at property 102. For example, a sensor can be associated with a video or image recording device located at the property 102, such as a digital camera or other imaging/recording device. In some implementations, a sensor(s) is operable to communicate with an imaging device and associated mechanisms that are used to determine or indicate whether items and packages have been delivered to the property or removed from a particular location of the property as well as to present status indications, including alerts and notifications, (described below) to residents or occupants at the property 102.

As described above, the property 102 is monitored by a property monitoring system. The property monitoring system can include a control unit that is used to send sensor data 125, obtained using sensors 120, to a remote monitoring server 160. The system 100 also includes an imaging device 122 (e.g., a camera) that is operable to generate image and video data that can be processed at the monitoring server 160 to monitor items at the property or to detect whether an individual has approached an entrance area of the property to deliver an item or package.

The sensors 120 can receive, via an example network at the property 102, a wireless (or wired) signal that controls operation of each sensor 120. For example, the signal can cause the sensors 120 to initialize or activate to sense activity at the property 102 and generate sensor data 125. The sensors 120 can receive the signal from monitoring server 160 or from the imaging device 122 that communicates with monitoring server 160. In addition to detecting and processing wireless signals received via the network, the sensors 120 can also transmit wireless signals that encode sensor data 125.

The monitoring server 160 receives and analyzes the sensor data 125 encoded in wireless signals transmitted by the sensors 120. For example, the monitoring server 160 analyzes the sensor data 125 encoded in the wireless signals to determine or to obtain information about activities occurring at the property 102, such as whether a person (or robotic delivery apparatus) is approaching or leaving the property 102 as well as items/packages that may be present at the property 102. As described in more detail below, the monitoring server 160 performs various functions related to processing, analyzing, or monitoring video and image data 124 as well as sensor parameter values included in the sensor data 125.

The imaging device 122 can be a security camera or a doorbell camera 122 that is configured to record or obtain images and video data. The camera 122 may be affixed or installed at an entrance of the property 102 to detect respective occurrences of individuals being within a threshold proximity of the property. The camera 122 may include a processor, a chipset, a memory system, or other computing hardware. In some cases, the camera 122 may include application-specific hardware, such as a field-programmable gate array (FPGA), an application-specific integrated circuit (ASIC), or other embedded or dedicated hardware. The camera 122 may also include software, which configures the device to perform the functions described in this document.

The camera 122 can be a computer system or other electronic device configured to communicate with the sensors 120 and the control unit to obtain image and sensor data that are indicative of events occurring at the property 102. The control unit 110 can activate a camera, lock or unlock a door/window, activate/arm an alarm system, de-activate/de-arm the alarm system, power on or off a light at the property 102, or communicate with one or more of the camera 122 and sensors 120. In some implementations, the camera 122, control units, monitoring servers, or other computing modules described herein are included as subsystems of the property monitoring system 100.

The camera or imaging device 122 can be a particular type of sensor 120 or may be a combination of different types of sensors 120. The camera 122 is configured to obtain video or image data 124 of an entrance area of the property 102. For example, the camera 122 can be a digital camera with video recording capability that is operable to capture video or still images within a viewable area 130 of the property 102.

The monitoring server 160 can be configured to perform various functions for analyzing and monitoring conditions of items and persons in the viewable area 130 at the property 102. For example, the monitoring server 160 can perform these functions based on the video data 124 and other sensor data 125 encoded in wired or wireless signal transmissions received by the monitoring server 160. More specifically, the monitoring server 160 includes a video analytics pipeline 165 that is used to perform the various functions for analyzing and monitoring conditions of items and persons in the viewable area 130.

In some implementations, the monitoring server 160 can generate alerts and notifications based on the video or image data 124 that is obtained for viewable area 130 and analyzed by the video analytics pipeline 165. Based in part on the image data 124, the monitoring server 160 is operable to: i) perform visual recognition with respect to a type, size, or shape of an item or package 132 within the viewable area 130; ii) perform visual recognition of an individual 133, such as a delivery person; iii) perform identity verification of the individual 133; and iv) generate video logs of detected motion, such as human motion or motion of a robotic delivery vehicle, and detected placement or removal of items within the viewable area 130.

In some cases, the monitoring server 160 can verify the identity of the individual 133 in response to visually analyzing physical/biometric features of the person, using various facial recognition techniques, or both. In some implementations, each of the camera 122 and the monitoring server 160 are configured to track events within the viewable area 130 using image frames that are based on video and image data 124 obtained using camera 122. The video and image data 124 can be represented by an input video stream that includes multiple image frames. The input video stream is generated to capture events occurring at the entrance area.

The camera 122 is configured to generate an input video stream (e.g., representing a recording stream) based on person-triggered motion detection. For example, the camera 122 can generate an input video stream based on detection of a person within a threshold distance of the property or the entrance area. In some implementations, the camera 122 generates the input video stream based on a proximity sensor, a motion sensor, images frame analysis, or combinations of each. Generating an input video stream can include generating a pre-event image frame and a post-event image frame. This is described in more detail below.

For example, the camera 122 can generate the video stream based on a proximity (or motion) sensor of the camera 122 that is operable to detect when a person is within a threshold proximity of the entrance area or in a field of view of the camera 122. Additionally, or alternatively, the camera 122 can generate the input video stream based on a motion sensor 120 of the property 102 that is operable to detect human motion, including motion of a robotic delivery vehicle, at certain areas of the property 102. The motion sensor 120 is operable to communicate with the camera 122 by transmitting parameter signals to the camera 122 to report detected motion at the entrance area.

In some implementations, the camera 122 can generate the input video stream based on any one of the different types of sensors 120 referenced in the example of FIG. 1. For example, generating the input video stream can be triggered based on sensor data 125, such as audio data or triggering of smart lights, which may indicate an individual 133 is at a particular area or threshold distance of the property 102. In some examples, the input video stream is triggered based on a pre-event image that reveals an individual 133 has entered a field of view of the camera 122 or is within in an area of interest that coincides with the field of view of the camera 122.

The camera 122 generates the input video stream in response to receiving and processing the parameter signals indicating detected motion, such as motion of a person or motion of a robotic delivery vehicle. In some instances the camera 122 (or the monitoring server 160) performs image analysis on image frames in the field of view of the camera 122. The image frames can be periodically, or iteratively, captured by the camera 122 and analyzed to detect or determine when a person at the entrance area or has entered the entrance area or is within a field of view of the camera. Additionally, the image frames can be periodically, or iteratively, captured by the camera 122 and analyzed to detect or determine when a person is within a threshold proximity of the entrance area or within a field of view of the camera 122.

The image frames can be captured and stored in a memory of the camera 122 (e.g., on-board memory). For example, the image frames can be captured and stored in an image frame buffer of the camera 122. In some examples, the image frame buffer can be configured to store a threshold amount of image frames for a given time period, e.g., 15 seconds, 30 seconds, 45 seconds. An example video/image frame buffer module of the system 100, operable to store image frames for processing and analysis, is described in more detail below with reference to FIG. 2.

As described in more detail below, the video analytics pipeline 165 is represented by sets of modules that cooperate to process image frames of an input video stream generated using the imaging device, e.g., camera 122. To detect delivery or removal of items or packages at the property 102, the system 100 uses the video analytics pipeline 165 to generate pre-event and post-event image frames for an area of interest, such as the entrance area of the property 102. More specifically, the system 100 is configured to trigger image frame processing on pre-event and post-event image frames to detect when an individual 133 is approaching or leaving the entrance of the property 102 to detect whether an item has been delivered or removed.

For example, the system 100 or camera 122 can trigger image frame processing to detect when an individual 133 is approaching the entrance area of property 102 based on a pre-event image (e.g., a pre-event image frame). The pre-event image frame is collected and analyzed in response to detecting that an individual is within a threshold distance of the entrance area. Likewise, the system 100 or camera 122 can trigger image frame processing to detect when an individual 133 is leaving (or has left) the entrance area of property 102 based on a post-event image (e.g., a post-event image frame). The post-event image frame may also be collected and analyzed in response to detecting that an individual is within a threshold distance of the entrance area.

In some implementations, the system 100 is configured to collect or obtain the post-event image frame using an image bounding box 150. For example, the camera 122 is operable to process instructions that cause the camera 122 generate a post-event image frame that includes an image bounding box 150. In some other implementations, the video analytics pipeline 165 applies the image bounding box 150 to items or candidate packages detected in the post-event image frame, for example, in response to processing and analysing the post-event image frame relative to the pre-event image frame.

The system 100 can perform item or feature recognition on image data 124 to detect candidate items or packages in the pre-event and post-event image frame data obtained from the camera 122. For example, the video analytics pipeline 165 can obtain a pre-event image and post-event image from the camera 122 based on image/video data 124 and process or analyze the data values of the image frames using a machine-learning (ML) model. In some implementations, the video analytics pipeline 165 using an ML model that implements a deep-learning algorithm to perform item/feature recognition on contents of the post-event image frame, e.g., based on image pixel values of the post-event image frame.

The ML model of the video analytics pipeline 165 can be used to apply the image bounding box 150 to items recognized in the post-event image frame. The image bounding box 150 can be configured as an overlay in the post-event image frame. The image bounding box 150 is operable to outline one or more items in the post-event image frame, such as candidate packages or other related items recognized in the post-event image frame.

As noted above, the system 100 can implement a background subtraction technique or a frame differencing technique at the video analytics pipeline 165 to compute foreground regions (e.g., from background subtraction) or differences in image pixels values (e.g., using frame differencing) for packages, or candidate packages, which may or may not be present in the pre-event frame relative to the post-event image frame. For example, the system 100 can perform these techniques at least by computing differences in image pixel values for respective candidate items in the post-event image frame that are bounded by an image bounding box 150 versus relative to the contents of a pre-event image frame.

An image change score is computed based on the differences in image pixel values between the pre-event image frame and post-event image frame. For example, an image change score is computed at least from the image pixel values for the candidate packages and with respect to the detected motion at the entrance, such as motion of a robotic delivery vehicle or a person. The image change score is compared to a threshold score (170). For example, the threshold score can be a predefined score that represents the extent of change between the pre-event image frame and post-event image frame to trigger detection of item/package delivery or removal of a package.

The system 100 is configured to generate an alert or notification 175 that indicates detection, or removal, of a package 132. For example, the monitoring server 160 can generate an alert in response to a comparison that reveals a particular change score exceeds a give threshold score (170). A user 108 can use a mobile/client device 140 to interact with a smart home application to receive the alerts generated by the system 100. In some examples, the mobile device 140 is used to provide commands to the camera 122 and monitoring server 160, e.g., via the control unit, to perform one or more operations described in this document.

The user 108 can be a property/home owner, security manager, property manager, or occupant/resident of the property 102. In some implementations, the user 108 communicates with the camera 122, the monitoring server 160, or control unit, through a software application (e.g., "smart home" or "smart business" application) installed on mobile device 140. The user 108 can perform various operations related to the property 102, such as obtaining a current view of the entrance area or of a package detected at the entrance area. The user 108 can perform these various operations by sending commands to one or more of the camera 122, the monitoring server 160, or sensors 120 at the property 102. In some cases the user 108 can define an area of interest (AOI) that represents an area where packages are placed when delivered to the property 102.

Figure 2:
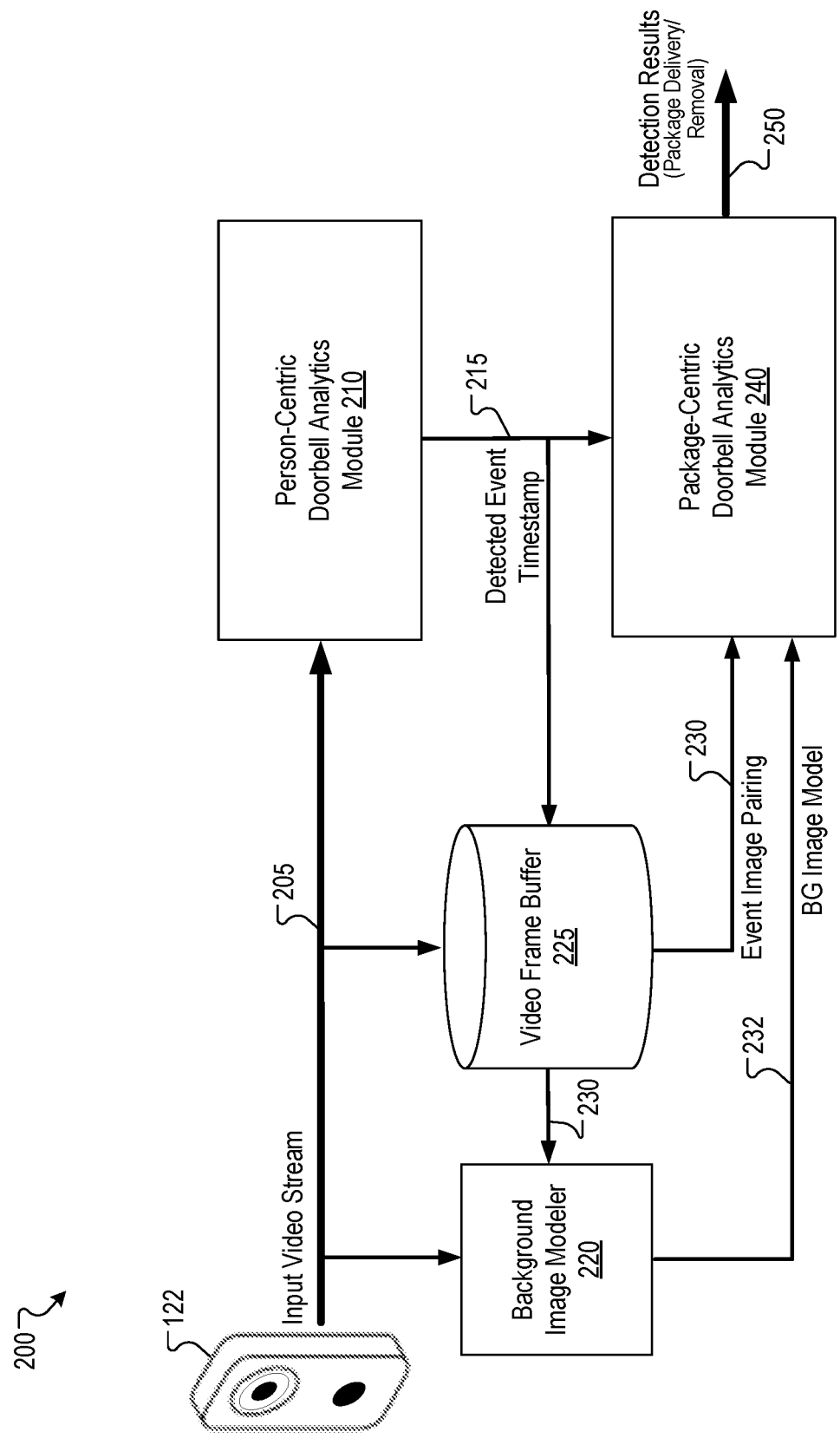
FIG. 2 shows a block diagram of an example analytics system that includes a person-centric and item-centric doorbell analytics module.

FIG. 2 shows a block diagram of an example analytics system 200 that receives and processes an input video stream 205. The analytics system 200 includes a person-centric analytics module 210, an item-centric analytics module 240, a video frame buffer 225, and a background image modeler 220. The analytics system 200 can be a portion of, or an extension of, the advanced video analytics pipeline 165 for residential periphery monitoring and surveillance, as described above. In some implementations, the analytics system 200 is run on an example doorbell camera, such as camera 122. In some other implementations, the analytics system 200 is run remotely at the monitoring server 160 relative to a location of the camera 122.

The person-centric analytics module 210 is configured to monitor person-related events and activities occurring that the property 102. For example, the person-centric analytics module 210 can implement item detection and recognition, such as image/video processing techniques for executing person-triggered motion detection, person detection and tracking, and face-detection. In some implementations, the person-centric analytics module 210 receives and processes parameter signals from an example motion detector/sensor 120 at the property 102 to execute the person-triggered motion detection.

The person-centric analytics module 210 generates alerts in response to detecting that a person is approaching or leaving a main entrance area covered by the camera 122 or is within the field of view of the camera 122. The person-centric analytics module 210 is also configured to detect when a person-related event has ended. For example, the person-centric analytics module 210 detects when a person-related event has ended based on image analysis and person recognition techniques applied to post-event image frames obtained from the input video stream 205.

As described above, the image frames of the input video stream 205 can be stored in a memory or frame buffer 225 of the camera 122 (e.g., on-board memory). For example, the image frames can be annotated based on timing information 215 that includes a corresponding time stamp (e.g., time=00:14.89) that is detected for the image frame. In some cases, the timestamp may have an example notation of hh:mm:ss.nnn.

The data relating to the image frames and the respective time stamps of the timing information 215 may be stored in the frame buffer 225 locally on the camera 122. The data may alternatively be stored remotely, relative to the camera 122, in an image frame buffer 225 of the monitoring server 160. The image frame buffer 225 is generally configured to store image frames for a given time period or a given duration of the input video stream 205, e.g., 15 seconds, 30 seconds, 45 seconds, etc.

The background image modeler 220 receives sets of frames from the input video stream and incorporates them into building a statistical background image model 220 (described below). As long as the person-centric analytics module 210 has not detected a person-related event, background image modeler 220 updates the background image as new frames are available.

The item-centric analytics module 240 cooperates with the person-centric analytics module 210 and the frame buffer 225, and background image modeler 220 to generate detection results 250. More specifically, the item-centric analytics module 240 operates or runs in conjunction with the person-centric analytics module 210 to generate results 250 indicating system 100 detected that an item or package has been delivered to, or removed from, an AOI (e.g., the entrance area) of the property 102. The item-centric analytics module 240 receives image pairing data 230 corresponding to pre-event image frames and post-event image frames and the background image model 232 as well as timing information 215 having respective time stamps at least for image frames with pixel data for person-related events. The analytics system 200 processes the image pairing data 230 and timing information 215 based on deep-learning and image processing techniques executed by the item-centric analytics module 240. This is described in more detail below with reference to the example of FIG. 2.

In general, the item-centric analytics module 240 provides advanced item and package monitoring capabilities relative to prior solutions for package monitoring at a property. For example, using the item-centric analytics module 240, the system 100 is operable to monitor and detect delivery or removal of include items such as shipping boxes (e.g., from online orders) and large envelops.

Figure 3:
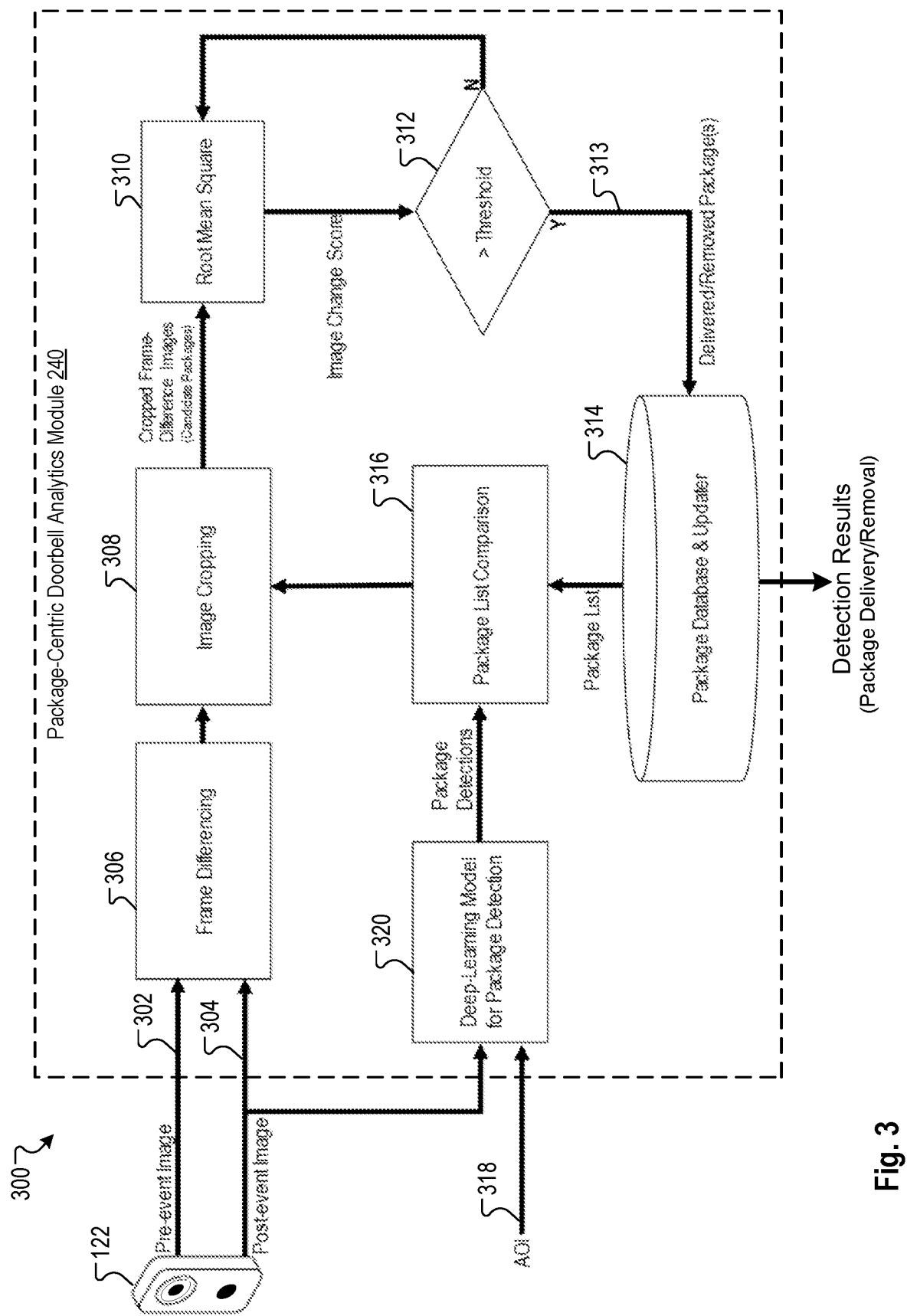
FIG. 3 shows a block diagram of a first example analytics system for implementing package monitoring using a doorbell camera.
Figure 4:
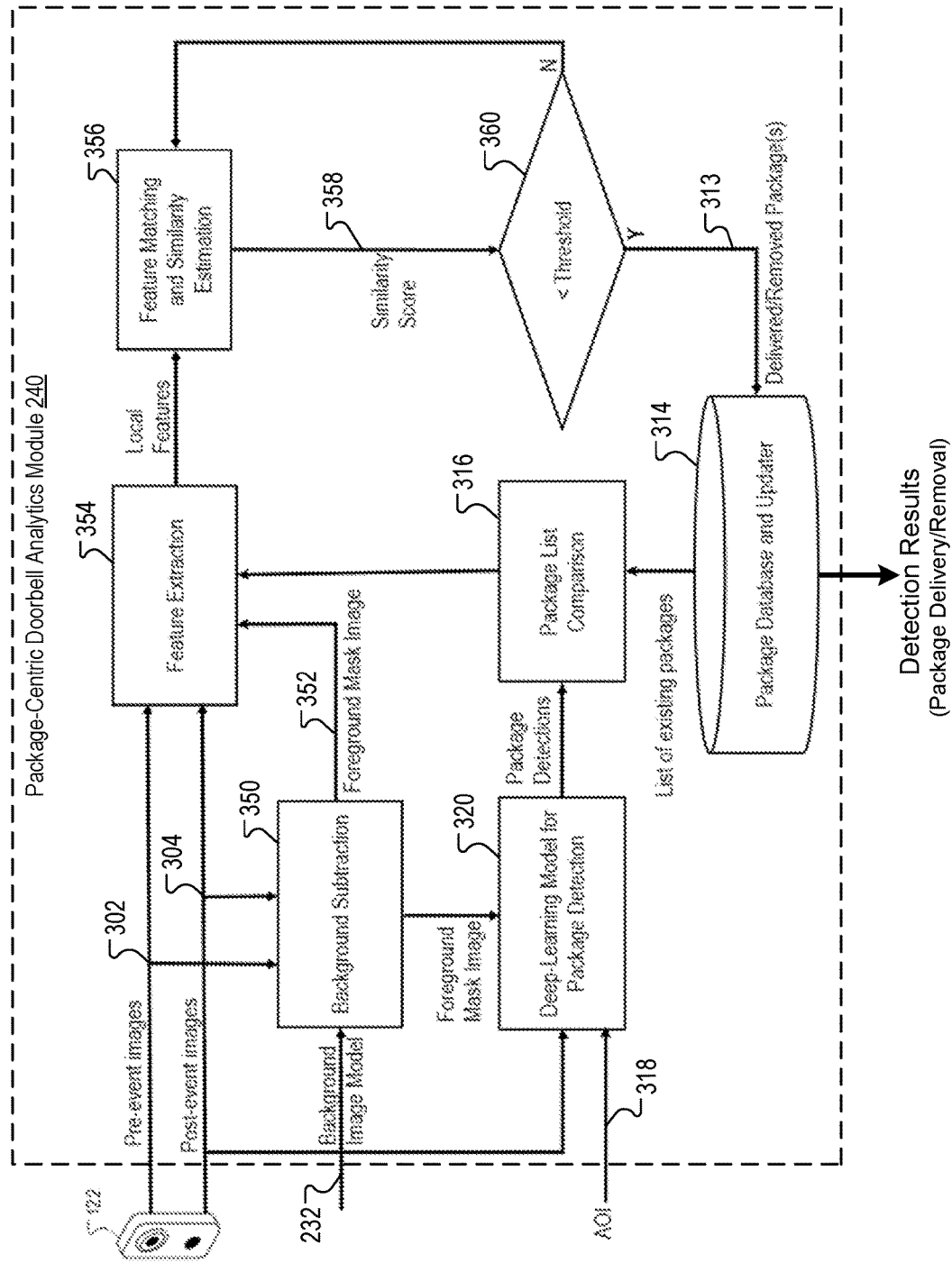
FIG. 4 shows a block diagram of a second example analytics system for implementing package monitoring using a doorbell camera.

Each of FIG. 3 and FIG. 4 shows a block diagram of an example analytics system 300, 400, respectively, for implementing item/package monitoring using a doorbell camera. Analytics system 300 is used to implement detection of packages using the frame differencing technique, whereas analytics system 400 is used to implement detection of packages using the background modeling and background subtraction technique(s). In some implementations, analytics system 300 and analytics system 400 are the same system. In some other implementations, analytics system 300 and analytics system 400 are different systems.

Each of the analytics system 300, 400 can be included at the system 100 as a sub-system of the item-centric analytics module 240 described above. For example, the analytics systems 300, 400 corresponds to the item-centric analytics module 240 and is referred to alternatively as the item (or package)-centric analytics module 240. Each of the analytics system 300, 400, including its respective component modules, may be implemented in hardware, software, or both.

The system 100 can use the analytics systems 300/400 to perform data intensive operations relating to prediction or inference computations for monitoring delivery and removal of items or packages in an AOI of camera 122. The analytics systems 300/400 are configured to process pre-event image frames and post-event image frames, including respective timestamps of the image frames, based on deep-learning and image processing techniques executed using one or more of the modules that form the respective analytics system 300/400. The analytics system 400 is also configured to process a background image model 232 as described in more detail below with reference to FIG. 4.

Referring now to FIG. 3, the analytics system 300 includes a frame differencing module 306, an image cropping module 308, and a root mean square (RMS) module 310. The frame differencing module 306 receives differing sets of image frames that represent the start and the end of a person-related event as well as the respective time stamps of each image frame in differing sets of image frames. As described above with reference to the example of FIG. 2, the item-centric analytics module 240 receives the image pairing data 230 and input timing information 215 from the person-centric analytics module 210.

In the example of FIG. 3, these portions of data can be represented by a pre-event image 302 and a post-event image 304 that are each received as inputs to the frame differencing module 306. For example, the input 302 can represent a data stream that includes pre-event image frames and a respective timestamp of each pre-event image frame. Likewise, the input 304 can represent a data stream that includes post-event image frames and a respective timestamp of each post-event image frame. In some implementations, analytics system 300 collects or obtains at least two respective image frames from the input streams. For example, the analytics system 300 can parse the image frames based on their respective time stamps and collect two image frames with reference to a timing relationship that indicates one image frame precedes the other.

Using the time stamps, the item-centric analytics module 240 collects and processes two images from the input video stream 205; one image (or image frame) that provides a visual of the AOI before a person-related event and another image (or image frame) that provides a visual of the AOI after the person-related event. As indicated above, these two images are referred to as a pre-event image and a post-event image, respectively. Although the pre- and post-event images are captured separately and at different times, the images may be collected or received concurrently for processing by the item-centric analytics module 240. In some implementations, collection of the pre- and post-event images occurs separately.

When a person-triggered event is detected by the person-centric analytics module 210, the corresponding event-start time is transmitted to the item-centric analytics module 240 for image collection and processing. In some implementations, the pre-event image corresponds to an image frame or set of image frames that precedes (e.g., by a few seconds or milliseconds) the start of the person-related event. The image frame precedes the start of the person-related event to ensure the system 100 is able to capture a clean reference view of visual scenes corresponding to the person-related event.

For example, the pre-event image frame may be captured at an instance that coincides with detection of an individual within a threshold distance of the property, whereas the start of the person-related event is when the individual 133 passes into the AOI. In some cases the AOI is an area that is smaller than the FOV of the camera 122 and does not extend all the way to the outer limit of the camera's FOV. In some other cases, the AOI coincides with the FOV of the camera 122 but does not extend to the threshold distance.

The frame differencing module 306 is configured to compute or generate a frame difference image based on the pre-event image input 302 and the post-event image input 304. For example, a frame difference image is computed by subtracting the pre-event image pixel by pixel from the post-event image and taking the absolute values of the pixel value differences as the pixel values in the frame difference image. In some implementations, the frame difference image is computed using data values associated with respective candidate items that are outlined by the image bounding box 150 of the post-event image frame. In some other implementations, the frame difference image is computed by subtracting specific regions or sections of the pre-event image frame from specific regions or sections of the post-event image frame.

For example, to process a set of image/frame inputs 302, 304 that each include the AOI, for each pixel, the frame differencing module 306 is configured to compute the frame difference image at least by identifying matching RGB values (e.g., 0-255 values) and taking the absolute value for each RGB value when subtracting the pre-event image input 302 from the post-event image input 304. In this example, a representative subtraction can include (100,100,100) RGB values at coordinate (0,0) (post-event image) subtracted by (50,100,150) RGB values at a matching coordinated (pre-event image), which results in a frame difference image at coordinate (0,0) with RGB values of (50, 0, 50).

The image cropping module 308 is configured to generate one or more cropped frame difference images with respect to candidate packages identified in frame difference images output by the frame differencing module 306. For example, the image cropping module 306 receives data corresponding to the frame difference image generated by the frame differencing module 306 and generates cropped frame difference images. The cropped frame difference images can be specific regions or sections of the frame difference image that correspond to a candidate package. In some implementations, a modified or cropped frame difference image of a candidate new package-bounding box is obtained by cropping (or removing) content of the frame difference images that is not specific to a section or region relating to the candidate package in a pre- or post-event image frame.

For example, during a person-related event in which an item is delivered to the property 102, a pre-event image frame can include content that does not correspond to a candidate item/package, whereas a post-event image frame does include content items resembling a package or box recently placed at the entrance area. The frame differencing module 306 computes a difference between these two frames and generates a frame difference image having a bounding box as an overlay to identify the content items resembling a package or box recently placed at the entrance area. The image cropping module 308 receives the frame difference image and generates the cropped frame difference image in response to cropping or removing parts of a digital image or (image frame) to retain a smaller section of the image defined by the bounding box.

Similarly, during a person-related event in which an item is removed, a pre-event image frame can include content items resembling a package or box placed at the entrance area, whereas a post-event image frame includes content that does not correspond to a candidate item/package. The frame differencing module 306 computes a difference between these two frames and generates a frame difference image having a bounding box as an overlay to identify sections or regions of the pre-event image that previously included content items resembling a package or box placed at the entrance area. This particular type of bounding box is a candidate missing package bounding box and is described in more detail below.

The image cropping module 308 receives the frame difference image and generates the cropped frame difference image in response to cropping or removing parts of a digital image or (image frame) to retain a smaller section of the image defined by the bounding box.

The root mean square (RMS) module 310 receives and processes the cropped frame difference image. The RMS module 310 is configured to compute the root mean or median square of the pixel values of the frame difference image. For example, the RMS module 310 is configured to compute the root mean or median square of the pixel values of the candidate new package-bounding box based on arithmetic operations encoded at the module. In some implementations, the computed pixels that are output by the RMS module 310 are used as the pre-post event image change measure score of an example candidate package box.

The change measure score output by the RMS module 310 is supplied an example comparator 312 that is configured to compare the change measure score to a threshold score. With respect to item/package delivery or detection, if the image change measure score is above a pre-defined threshold, the candidate package box is declared as a new package. Similarly, with respect to detected removal of an item or package, if the image change measure score is above a pre-defined threshold, the candidate package box may be declared or identified as a newly removed item.

The comparator 312 can be implemented in hardware or software and is operable to generate an output signal that indicates whether a new package has been detected or removed. In some implementations, the comparator 312 is associated with the "item detection" threshold comparison logic block of FIG. 1. Using the comparator 312, analytics system 300/400 (or monitoring server 160) is operable to generate an output signal 313 corresponding to when a package is delivered or removed. The signal 313 is provided as an input to an item/package database & updater 314.

The analytics system 300/400 uses the database & updater 314 to maintain a status of delivery and removal activities relating to packages or other items 132 that are placed at a particular area of the property, such as the entrance area. For example, the analytics system 300/400 iteratively updates the database & updater 314 to keep a current package/item list of delivered packages. In some implementations, the database & updater 314 includes data representing the image-bounding box of a delivered (or removed) package. For example, the database & updater 314 is configured to store a time of package delivery and/or a time of package removal, if removed later. The database & updater 314 can store this particular timestamp information in a data field for a corresponding database entry for the package.

In general, using a pair of pre- and post-event images, the video analytics pipeline 165 can trigger image frame analytics when a package is delivered or removed during the person-related event that occurs between the capture of the pair of the pre- and post-event images. To this end, each of the frame differencing module 306, image cropping module 308, the RMS module 310, and comparator 312 can cooperate to provide package verification features of the image frame analytics that may be augmented or enhanced using machine-learning (e.g., deep learning).

For example, the system 100 can include a deep package detection model 320 that implements one or more deep-learning algorithms to compute or predict package delivery or removal in response to processing image data representing the pre-event image 302 and a post-event image 304. In some implementations, the deep package detection model 320 ("model 320") is first trained for detection of package delivery or detection of package removal. For example, the package detection model 320 can be trained using RGB input images or RGB+frame difference image between the pre-event and post-event images. The pre-event image can be represented by a background model learned using multiple pre-event images. Based on this training, the system 100 is operable to develop a model 320 (e.g., a predictive model), where candidate packages can be first detected in the AOI of the post-event image 304 using the generated outputs of the deep package detection model 320.

The model 320 is configured to generate candidate box detection signals based on items in the post-event image 304 that indicate candidate packages that may have been delivered to an area of the property. The analytics systems 300/400 each include a package list comparison module 316 that is operable to compare the candidate packages against a current package list retrieved from the package database & updater 314. For example, the comparison module 316 receives candidate box detection signals that indicate one or more candidate packages are detected in the AOI and processes data values of the signal indications against data values for entries for new or existing package entries at the database. Based on this operation, the comparison module 316 determines if there is any new package detected or any previously existing packages missing from the post-event image 304.

If a new package is detected, the comparison module 316 can generate a triggering signal to trigger or apply an image change-based new package verification feature of analytics system 300. For example, the analytics system 300 is configured to apply this component to suppress false detections that may be caused by some box-like objects in the background of an image frame of a post-event image 304. The image change-based new package verification feature of analytics system 300 corresponds to the example process flows described above with reference to operations involving the frame differencing module 306, image cropping module 308, the RMS module 310, and comparator 312.

As described above, given a candidate new package detection bounding box, the package verification features (e.g., that are implemented using each of the frame differencing module 306, image cropping module 308, the RMS module 310, and comparator 312) are used to measure image change between the pre- and post-event images 302, 304 with respect to a candidate package box to determine if an item/package in the AOI it is a true package. In some other implementations, the example deep-learning model 320 can be used to enhance the package verification features described above.

In some implementations, if the analytics system 300 determines a previously existing package is missing, a change-based missing package verification feature is also applied to suppress false package removal due to package detection failure in a post-event image 304. This change-based missing package verification feature operates the same as, or substantially similar to, the new package verification feature, except that instead of using the candidate new package bounding box for computing the image change measure, the missing package verification feature uses a candidate missing package bounding box. If the image change measure computed using the missing package-bounding box and the frame difference image is above a pre-defined threshold, a package removal is detected.

In case of detection of package delivery or package removal, the analytics system 300 is configured to update the package database 314, for example, by adding a new entry, such as a new package delivery entry, or by updating an existing package delivery entry to add timestamp information to indicate a package removal time.

Referring now to FIG. 4, the analytics system 400 includes a background subtraction module 350, a feature extraction module 354, and a feature similarity module 356. As described above with reference to the example of FIG. 2, the item-centric analytics module 240 receives the image pairing data 230, input timing information 215 from the person-centric analytics module 210, and the background image model 232 generated by the background image modeler 220.

The background subtraction module 350 receives differing sets of image frames (corresponding to the image pairing data 230) that represent the start and the end of activity detected at the property (e.g., a person-related event) as well as the respective time stamps of each image frame in the differing sets of image frames. The background subtraction module 350 also receives input data representing the background image model 232.

In the example of FIG. 3, these portions of data can be represented by a set of pre-event images 302, a set of post-event images 304, and the background image model 232 that are each received as inputs to the background subtraction module 350. For example, the input 302 can represent a data stream that includes pre-event image frames and a respective timestamp of each pre-event image frame. Likewise, the input 304 can represent a data stream that includes post-event image frames and a respective timestamp of each post-event image frame. Further, the input 232 can represent an example binary file for a background image modeler.

In some implementations, analytics system 400 collects or obtains at least two respective image frames from the input streams. For example, the analytics system 400 can parse the image frames based on their respective time stamps and collect two image frames with reference to a timing relationship that indicates one image frame precedes the other.

Using the time stamps, the item-centric analytics module 240 collects and processes two images from the input video stream 205; one image (or image frame) that provides a visual of the AOI before a person-related event and another image (or image frame) that provides a visual of the AOI after the person-related event. As indicated above, these two images are referred to as a pre-event image and a post-event image, respectively. The item-centric analysis module 240 can use a set of pre-event images and a set of post-event images instead of a single pre- or post-event image.

In some implementations, the pre-event image corresponds to an image frame or set of image frames that precedes (e.g., by a few seconds or milliseconds) the start of the person-related event. The image frame precedes the start of the person-related event to ensure the system 100 is able to capture a clean reference view of visual scenes corresponding to the person-related event. The background modeler 220 continuously updates a background image based on each of the pre-event image frames before an occurrence of a person-centric event.

For example, the pre-event image frame may be captured at an instance that coincides with detection of an individual within a threshold distance of the property, whereas the start of the person-related event is when the individual 133 passes into the AOI. In some cases the AOI is an area that is smaller than the FOV of the camera 122 and does not extend all the way to the outer limit of the camera's FOV In some other cases, the AOI coincides with the FOV of the camera 122 but does not extend to the threshold distance.

The background subtraction module 350 is configured to compute or generate a foreground mask image 352 based on the pre-event images input 302, the post-event images input 304, and the background image model 232. For example, a foreground mask image 352 can be generated by statistically subtracting the background image model 232 from a post-event frame. In some implementations, the statistical subtraction is performed on a pixel by pixel basis across different color spaces, such as RGB or YUV (e.g., using y-channel). In some implementations, the foreground mask image 352 is computed by comparison between the data values associated with respective candidate items that are outlined by the image bounding box 150 of the post-event image frame and the corresponding data values of the background image model 232.

For example, the background image model 232 can be a set of Gaussian Mixture Models (GMM) that are learned for each pixel for a given background of an image. To process a set of post-event images 304 that each include the AOI, for each pixel inside the AOI, the background subtraction module 350 computes a distance between an RGB value of the pixel (e.g., 0-255 values) and a corresponding pixel of a background image generated with the GMM model. The background subtraction module 350 applies a particular threshold to the distance values. For a distance value that is below (or smaller) than the threshold, the background subtraction module 350 sets the value to zero. For remaining distance values, the background subtraction module 350 is configured to normalize those values. In some implementations, the normalized values are used as gray-scale values to generate a gray-scale foreground mask 352. In some other implementations, the normalized values are set to 1 and used to generate a binary foreground mask 352.

Feature extraction module 354 is configured to extract local salient features from the identified candidate package regions in the pre and post event images using the foreground mask image 352. For example, the feature extraction module 354 receives the pre-event and post-event images 302, 304 as well as the bounding boxes of candidate new packages and/or candidate missing packages indicated by the foreground mask image 352. The features are extracted from the image regions inside the bounding boxes in the pre- and post-event frames.

During a person-related event in which an item is delivered to the property 102, a pre-event image frame can include content that does not correspond to a candidate item/package, whereas a post-event image frame does include content items resembling a package or box recently placed at the entrance area. The background subtraction module 350 computes a difference between these two frames and generates a foreground mask image 352. The background substitution module 350 can also compute the foreground mask image 352 using the background image model 232.

The foreground mask image 352 can have a bounding box as an overlay to identify the content items resembling a package or box recently placed at the entrance area. The feature extraction module 354 receives the pre- and post-event frames 302, 304 and the bounding box information and extracts the local features from those regions. The bounding box information is conveyed via the foreground mask image 352. For example, the feature extraction module 354 extracts local features of candidate regions in the pre- and post-event images 302, 304.

Similarly, during a person-related event in which an item is removed, a pre-event image frame can include content items resembling a package or box placed at the entrance area, whereas a post-event image frame includes content that does not correspond to a candidate item/package. The background subtraction module 350 computes a difference between these two frames and generates a foreground mask image 352 having a bounding box as an overlay to identify sections or regions of the pre-event image that previously included content items resembling a package or box placed at the entrance area. This particular type of bounding box is a candidate missing package bounding box and is described in more detail below.

The feature extraction module 354 receives the foreground mask image 352 and outputs the extracted local features of candidate regions in the pre- and post-event images that were extracted with reference to areas defined by the bounding box of the foreground mask image 352.

The feature similarity module 356 receives and processes the extracted local features. The feature similarity module 356 is configured to compute feature matching and similarity estimations using the local features of the candidate regions in the pre- and post-event images. For example, the feature similarity module 356 receives the extracted features between pre-event images and post-event images and performs a matching estimation. In some implementations, the feature similarity module 356 matches extracted features of pre- and post-event images together by enforcing rigidity and stationary constraints. Following the matching operation, the feature similarity module 356 can then compute a similarity metric between corresponding regions of two images. In some implementations, the computed similarity metrics that are output by the feature similarity module 356 are used as the pre-post event image similarity score of an example candidate package box.

The similarity score output by the feature similarity module 356 is supplied to the comparator 312 to compare the similarity score to a threshold score. With respect to item/package delivery or detection, if the image distance similarity score is below a pre-defined threshold, the candidate package box is declared as a new package. Similarly, with respect to detected removal of an item or package, if the similarity score is above a pre-defined threshold, the candidate package box may be declared or identified as a newly removed item.

In general, using a pair of pre- and post-event images, the video analytics pipeline 165 can trigger image frame analytics when a package is delivered or removed during the person-related event that occurs between the capture of the pair of the pre- and post-event images. To this end, each of the background subtraction module 350, feature extraction module 354, and the feature similarity module 356 of analytics system 400 cooperate to provide package verification features of the image frame analytics, which may be augmented or enhanced using machine-learning (e.g., deep learning).

If a new package is detected, the comparison module 316 can generate a triggering signal to trigger or apply a feature-matching based new package verification method of the analytics system 400. For example, the analytics system 400 is configured to apply this method to suppress false detections that may be caused by some box-like objects in the background of an image frame of a post-event image 304. The feature-matching based new package verification method of analytics system 400 corresponds to the example process flows described above with reference to operations involving the background subtraction module 350, feature extraction module 354, and the feature similarity module 356.

As described above, given a candidate new package detection bounding box, the package verification methods (e.g., that are implemented using each of the background subtraction module 350, feature extraction module 354, the feature similarity module 356, and comparator 312) are used to measure image change between the pre- and post-event images 302, 304 with respect to a candidate package box to determine if an item/package in the AOI it is a true package. In some other implementations, the example deep-learning model 320 can be used to enhance the package verification features described above.

In some implementations, if the analytics system 400 determines a previously existing package is missing, a feature-matching based missing package verification method is also applied to suppress false package removal due to package detection failure in a post-event image 304. This feature-matching based missing package verification method operates the same as, or substantially similar to, the new package verification method, except that the missing package verification method uses a candidate missing package bounding box. If the image distance measure computed using the missing package-bounding box and the regions in the pre-event and post-event images is above a pre-defined threshold, a package removal is detected.

Figure 5:
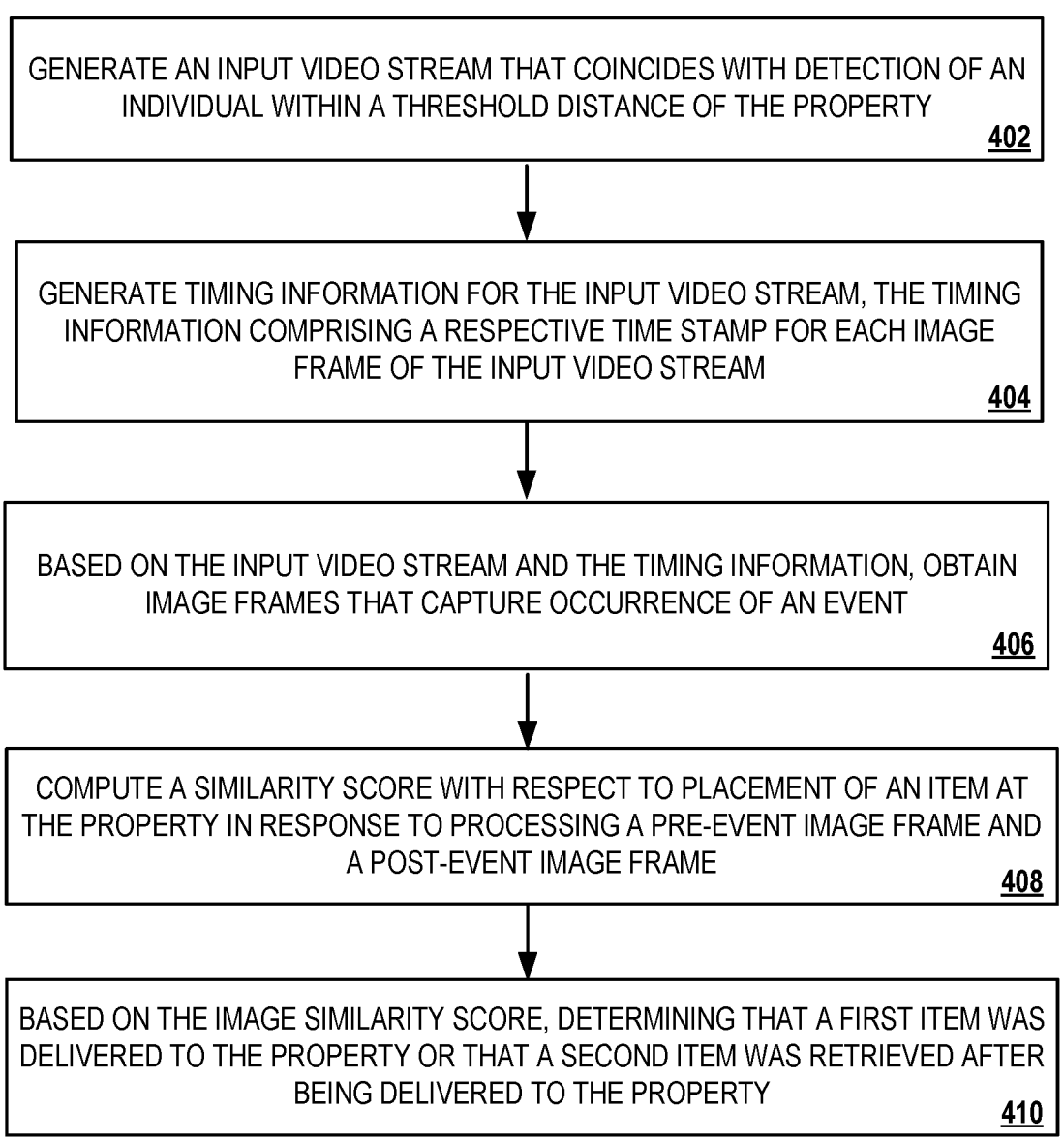
FIG. 5 shows an example process for performing package monitoring using a doorbell camera.

FIG. 5 shows an example process 450 for performing package monitoring using a doorbell camera. Process 450 can be implemented or executed using the system 100 described above. Descriptions of process 450 may reference the above-mentioned computing resources of system 100, including the analytics system 200 and its components and resources. Steps or actions of process 450 can be performed based on programmed firmware or software instructions, which are executable by one or more processors of the devices and resources described in this document.

Referring now to process 450, the system 100 generates an input video stream of an area of a property (402). For example, the camera 122 can generate an input video stream 205 that coincides with detection of an individual 133 within a threshold distance of the entrance area of property 102. In some implementations, process 450 represents a computer-implemented method that uses a video analytics pipeline and a doorbell camera, such as camera 122, to monitor items and packages delivered to a property.

To start or initiate package monitoring, a homeowner (e.g., user 108) can define an area of interest (AOI) that represents an area where packages are placed when delivered to the property 102. For example, the user 108 can interact with a graphical interface of a smart home application to draw, or otherwise define, an AOI within a field of view (FOV) of the doorbell camera 122. The user 108 draws the AOI to define an area where packages delivered to the property 102 are usually placed. In some cases, a user-defined AOI may not be defined or available at system 100. For these cases, the system 100 is configured to use a default AOI setting. For example, the system 100 can be programmed to include an AOI that defaults to a lower ⅓ portion of the FOV of the camera 122. In some implementations, the AOI is represented by the viewable area 130 and corresponds to the entrance area of the property, the FOV of the camera, or both.

The system 100 can perform image processing to determine an optimal AOI for obtaining a clear view, resolution, or image detail of candidate items. The system 100 can perform the processing to determine the optimal AOI based on areas or items depicted in a representative image of the entrance area or some other relevant area of the property 102. The system 100 can also dynamically adjust or modify a default AOI setting to optimize image details of candidate items. For example, the default AOI setting can be gradually refined in accordance with actual detection results that are generated by the package analytics module 240 of the video analytics pipeline 165.

Referring again to process 450, the system 100 generates timing information for the input video stream (404). For example, the video analytics pipeline 165 receives the input video stream 205 as image/video data 124 and generates the timing information in response to processing respective image frames of the input video stream 205. The timing information includes a respective time stamp for each image frame of the input video stream 205. The system 100 obtains image frames that capture occurrence of an event at the property based on the input video stream and the timing information (406). More specifically, the system 100 can obtain image frames including a pre-event image frame that precedes detection of the activity and a post-event image frame that coincides with detection of the activity.

For example, the video analytics pipeline 165 can, for a first time stamp, obtain a pre-event image frame of an AOI and, for a second time stamp, obtain a post-event image frame of the AOI. In some implementations, each of the pre-event image frame and post-event image frame are obtained with respect to a boundary that overlaps with the threshold distance. For example, the threshold distance may be set based on the FOV of the camera 122. In this example, the AOI can correspond to the FOV of the camera 122 such that at least one boundary line of a user-defined, or default, AOI overlaps with the threshold distance (or the edge of the FOV).

The system 100 computes an image score (e.g., a similarity score) with respect to placement of a candidate item at the property (408). The video analytics pipeline 165 computes the image score in response to processing a pre-event image frame and a post-event image frame. In some implementations, processing the pre-event image frame and the post-event image frame includes: i) computing a foreground region of the post-event image based on background modeling applied at least to the pre-event image and ii) extracting, using local feature extraction, a set of features from the foreground region. For example, background subtraction module 350 computes a difference between the pre- and post-event image frames and generates a foreground mask image 352 based on the computed difference. In some examples, generating the foreground mask image 352 includes statistically subtracting the background image model 232 from the post-event image frame. The feature extraction module 354 receives the foreground mask image 352 and outputs extracted local features of candidate regions in the pre- and post-event image frames. The features may be extracted based on areas defined by the bounding box of the foreground mask image 352.

The system 100 computes the image score based at least on the set of features extracted from the foreground region. The computed image score can be a region-based similarity score that characterizes similarity between respective regions of the pre-event image frame and the post-event image frame. For example, the feature similarity module 356 receives the extracted local features and computes feature matching and similarity estimations based on local features of the candidate regions in the two frames. The similarity score is computed from the estimations. In some implementations, the video analytics pipeline 165 processes each of the pre-event and post-event image frames using a ML model that implements a deep-learning algorithm. The deep-learning algorithm is used to train the ML model for package detection based on multiple types of images, including multiple different color images.

Based on the similarity score, the system 100 determines that a first item was delivered to the property or that a second item was removed after being delivered to the property (410).

Figure 6:
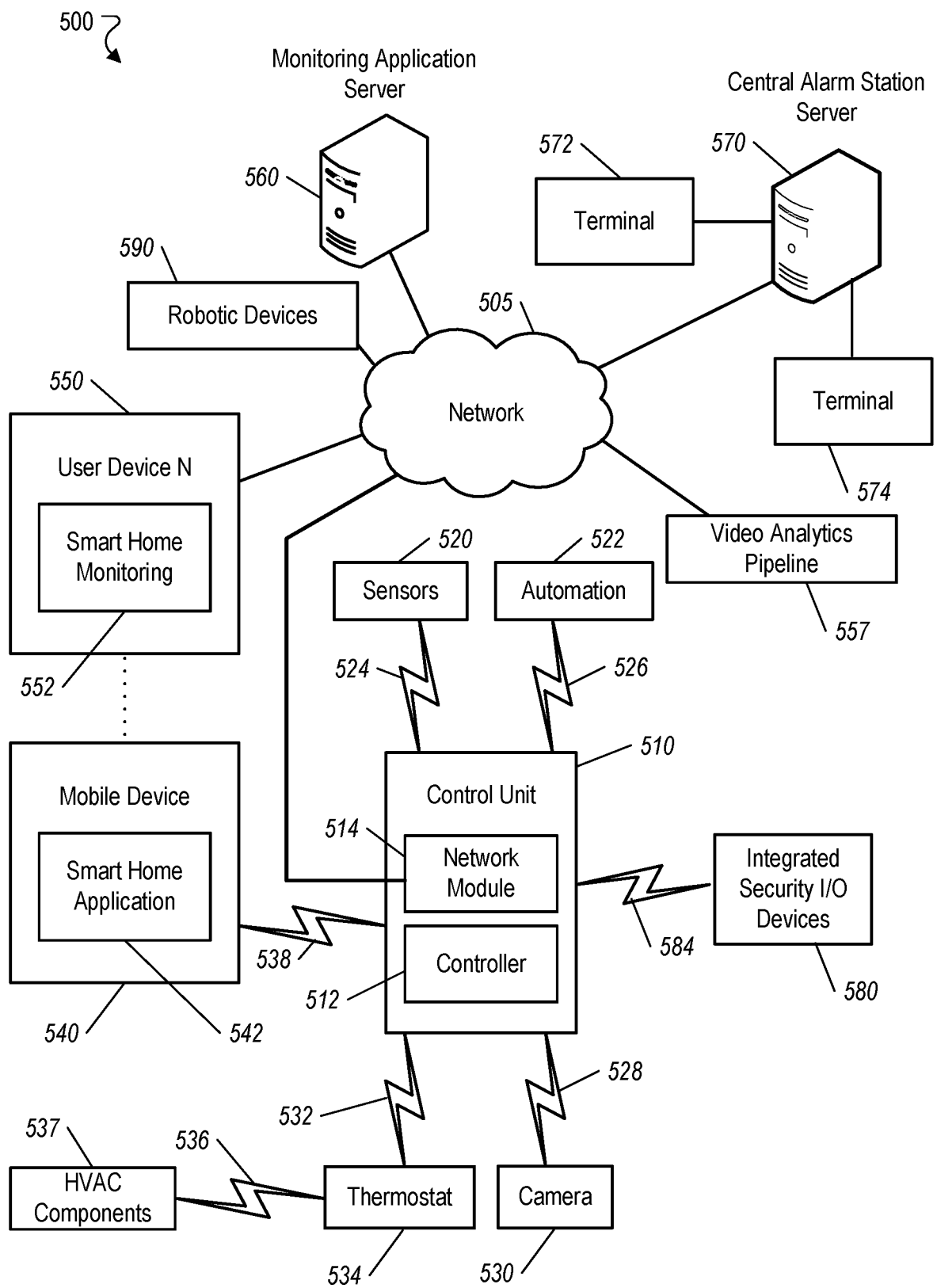
FIG. 6 shows a diagram illustrating an example property monitoring system.

FIG. 6 is a diagram illustrating an example of a property monitoring system 500. The electronic system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, x.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. Also, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information 556 and the state of the HVAC system components to the thermostat 534 and can control the one or more components of the HVAC system based on commands received from the thermostat 534.

The system 500 includes one or more video analytics engines 557. Each of the one or more video analytics engines 557 connects to control unit 510, e.g., through network 505. The video analytics engines 557 can be computing devices (e.g., a computer, microcontroller, FPGA, ASIC, or other device capable of electronic computation) capable of receiving data related to the sensors 520 and communicating electronically with the monitoring system control unit 510 and monitoring server 560.

The video analytics engine 557 receives data from the camera 122 and one or more sensors 520. In some examples, the video analytics engine 557 can be used to determine or indicate whether a package is delivered to the property based on data generated by the camera 122, including data from sensors 520 (e.g., data from sensor 520 describing motion, movement, temperatures and other parameters). The video analytics engine 557 can receive data from the camera 122 and the one or more sensors 520 through any combination of wired and/or wireless data links. For example, the video analytics engine 557 can receive sensor data via a Bluetooth, Bluetooth LE, Z-wave, or Zigbee data link.

The video analytics engine 557 communicates electronically with the control unit 510. For example, the video analytics engine 557 can send data related to the image frames and the sensors 520 to the control unit 510 and receive commands related to item delivery at the property based on processing of the image frames and data from the sensors 520. In some examples, the video analytics engine 557 processes or generates sensor signal data, for signals emitted by the sensors 520, prior to sending it to the control unit 510. The sensor signal data can include information that indicates an operating mode of the camera 122, as well as image or video data generated by the camera 122.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, 536, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 6 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the camera 530 and/or reports related to the monitoring system. Although FIG. 6 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, the robotic devices 590, and the video analytics engine 557. The one or more user devices 540 and 550 receive data directly from the camera 122, sensors 520, the home automation controls 522, the camera 530, the robotic devices 590, and the video analytics engine 557 and sends data directly to the camera 122, sensors 520, the home automation controls 522, the camera 530, the robotic devices 590, and the video analytics engine 557. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, the robotic devices 590, and the video analytics engine 557 are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, the robotic devices 590, and the video analytics engine 557 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, the robotic devices 590, and the video analytics engine 557 to a pathway over network 505 when the one or more user devices 540 and 550 are farther from the sensors 520, the home automation controls 522, the camera 530, the thermostat 534, the robotic devices 590, and the safety engine.

In some examples, the system leverages GPS information from the one or more user devices 540 and 550 to determine whether the one or more user devices 540 and 550 are close enough to the sensors 520, the home automation controls 522, the camera 530, the thermostat 534, the robotic devices 590, and the video analytics engine 557 to use the direct local pathway or whether the one or more user devices 540 and 550 are far enough from the sensors 520, the home automation controls 522, the camera 530, the thermostat 534, the robotic devices 590, and the video analytics engine 557 that the pathway over network 505 is required.

In other examples, the system leverages status communications (e.g., pinging) between the one or more user devices 540 and 550 and the sensors 520, the home automation controls 522, the camera 530, the thermostat 534, the robotic devices 590, and the video analytics engine 557 to determine whether communication using the direct local pathway is possible. If communication using the direct local pathway is possible, the one or more user devices 540 and 550 communicate with the sensors 520, the home automation controls 522, the camera 530, the thermostat 534, the robotic devices 590, and the video analytics engine 557 using the direct local pathway. If communication using the direct local pathway is not possible, the one or more user devices 540 and 550 communicate with the sensors 520, the home automation controls 522, the camera 530, the thermostat 534, the robotic devices 590, and the video analytics engine 557 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
generating an input video stream comprising at least one image frame that coincides with detection of activity within a threshold distance of a property;
generating timing information for the input video stream, the timing information comprising a respective time stamp for each image frame of the input video stream;
using the input video stream and the timing information, obtaining image frames comprising a pre-event image frame that precedes detection of the activity and a post-event image frame that coincides with detection of the activity;
computing a difference in pixel values by subtracting a first pixel value corresponding to pixels in the pre-event image frame from a second pixel value corresponding to pixels in the post-event image frame;
in response to computing the difference in pixel values, generating a foreground region of the post-event image based on background image modeling applied to the pre-event image;
extracting, using local feature extraction, a set of features from the foreground region;
computing an image score with respect to placement of a candidate item at the property based on the difference in pixel values and the set of features extracted from the foreground region; and
in response to determining that the image score exceeds a threshold score, determining that a first item was delivered to the property or that a second item was removed after being delivered to the property.

2. The method of claim 1, wherein obtaining image frames comprises:
for a first time stamp, obtaining a pre-event image frame of an area of interest (AOI) having a boundary that overlaps with the property within a threshold distance from an imaging device at the property; and
for a second time stamp, obtaining a post-event image frame of the AOI with respect to the boundary that overlaps with the property.

3. The method of claim 2, wherein:
the AOI includes a pre-event AOI that overlaps a portion of an area depicted in the pre-event image; and
the AOI coincides with a field of view of an imaging device used to generate the input video stream.

4. The method of claim 2, wherein obtaining image frames comprises:
obtaining a post-event image frame that includes an image bounding box, wherein the image bounding box:
is configured as an overlay in the post-event image frame; and
outlines the candidate item.

5. The method of claim 4, wherein processing each of the pre-event image frame and the post-event image frame comprises:
processing each of the pre-event and post-event image frames using a machine-learning (ML) model that implements a deep-learning algorithm used to train the ML model for package detection using a plurality of color images.

6. The method of claim 5, comprising:
in response to processing the post-event image frame using the ML model, detecting, from the post-event image frame, that the candidate item was placed at the property; and
in response to detecting that the candidate item was placed at the property, generating, using the ML model, the image bounding box as the overlay in the post-event image frame to outline the candidate item.

7. The method of claim 1, wherein the candidate item is a package.

8. The method of claim 1, wherein computing the image score comprises:
computing the image score in response to extracting the set of features from the foreground region.

9. The method of claim 8, wherein computing the image score comprises:
computing, as the image score, a region-based similarity score that characterizes similarity between respective regions of the pre-event image frame and the post-event image frame.

10. The method of claim 1, wherein:
the input video stream is obtained using a doorbell camera and a local frame buffer that is local to the doorbell camera.

11. A system comprising:
a processing device; and
a non-transitory machine-readable storage device storing instructions that are executable by the processing device to cause performance of operations comprising:
generating an input video stream comprising at least one image frame that coincides with detection of activity within a threshold distance of a property;
generating timing information for the input video stream, the timing information comprising a respective time stamp for each image frame of the input video stream;
in response to the input video stream and the timing information, obtaining image frames comprising a pre-event image frame that precedes detection of the activity and a post-event image frame that coincides with detection of the activity;
computing a difference in pixel values by subtracting a first pixel value corresponding to pixels in the pre-event image frame from a second pixel value corresponding to pixels in the post-event image frame;
in response to computing the difference in pixel values, generating a foreground region of the post-event image based on background image modeling applied to the pre-event image;
extracting, using local feature extraction, a set of features from the foreground region;

computing an image score with respect to placement of a candidate item at the property based on the difference in pixel values and the set of features extracted from the foreground region; and in response to determining that the image score exceeds a threshold score, determining that a first item was delivered to the property or that a second item was removed after being delivered to the property.

12. The system of claim 11, wherein obtaining image frames comprises:

for a first time stamp, obtaining a pre-event image frame of an area of interest (AOI) having a boundary that overlaps with the property within a threshold distance from an imaging device at the property; and for a second time stamp, obtaining a post-event image frame of the AOI with respect to the boundary that overlaps with the property.

13. The system of claim 12, wherein:

the AOI includes a pre-event AOI that overlaps a portion of an area depicted in the pre-event image; and the AOI coincides with a field of view of an imaging device used to generate the input video stream.

14. The system of claim 12, wherein obtaining image frames comprises:

obtaining a post-event image frame that includes an image bounding box, wherein the image bounding box:

is configured as an overlay in the post-event image frame; and outlines the candidate.

15. The system of claim 14, wherein processing each of the pre-event image frame and the post-event image frame comprises:

processing each of the pre-event and post-event image frames using a machine-learning (ML) model that implements a deep-learning algorithm used to train the ML model for package detection using a plurality of color images.

16. The system of claim 15, wherein the operations comprise:

in response to processing the post-event image frame using the ML model, detecting, from the post-event image frame, that the candidate item was placed at the property; and in response to detecting that the candidate item was placed at the property, generating, using the ML model, the image bounding box as the overlay in the post-event image frame to outline the candidate item.

17. The system of claim 11, wherein:

computing the image score comprises: computing the image score in response to extracting the set of features from the foreground region; and the image score is a region-based similarity score that characterizes similarity between respective regions of the pre-event image frame and the post-event image frame.

18. One or more non-transitory machine-readable storage devices storing instructions that are executable by one or more processing devices to cause performance of operations comprising:

generating an input video stream comprising at least one image frame that coincides with detection of activity within a threshold distance of a property;

generating timing information for the input video stream, the timing information comprising a respective time stamp for each image frame of the input video stream;

in response to the input video stream and the timing information, obtaining image frames comprising a pre-event image frame that precedes detection of the activity and a post-event image frame that coincides with detection of the activity;

computing a difference in pixel values by subtracting a first pixel value corresponding to pixels in the pre-event image frame from a second pixel value corresponding to pixels in the post-event image frame;

in response to computing the difference in pixel values, generating a foreground region of the post-event image based on background image modeling applied to the pre-event image;

extracting, using local feature extraction, a set of features from the foreground region;

computing an image score with respect to placement of a candidate item at the property based on the difference in pixel values and the set of features extracted from the foreground region; and in response to determining that the image score exceeds a threshold score, determining that a first item was delivered to the property or that a second item was removed after being delivered to the property.

\* \* \* \* \*